(12) United States Patent
Kull

(10) Patent No.: US 10,012,337 B2
(45) Date of Patent: Jul. 3, 2018

(54) HYDRAULIC MANIFOLD CAP WEB

(71) Applicant: SIKORSKY AIRCRAFT CORPORATION, Stratford, CT (US)

(72) Inventor: Jon Francis Kull, Plainville, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 15/317,709

(22) PCT Filed: Jun. 11, 2015

(86) PCT No.: PCT/US2015/035262
§ 371 (c)(1),
(2) Date: Dec. 9, 2016

(87) PCT Pub. No.: WO2015/191813
PCT Pub. Date: Dec. 17, 2015

(65) Prior Publication Data
US 2017/0130890 A1 May 11, 2017

Related U.S. Application Data

(60) Provisional application No. 62/010,740, filed on Jun. 11, 2014.

(51) Int. Cl.
*F16L 55/10* (2006.01)
*A61M 1/00* (2006.01)
*F16L 55/115* (2006.01)

(52) U.S. Cl.
CPC .................. *F16L 55/115* (2013.01)

(58) Field of Classification Search
CPC ..................................................... B65D 55/16
USPC ................ 138/89, 89.1–89.4, 96 R; 215/306
See application file for complete search history.

(56) References Cited

U.S. PATENT DOCUMENTS

| | | | |
|---|---|---|---|
| 6,331,246 B1 * | 12/2001 | Beckham | A61M 1/0056 137/545 |
| 7,163,618 B2 * | 1/2007 | Beckham | A61M 1/0056 137/602 |
| 7,347,455 B1 | 3/2008 | Taquino | |
| 9,056,158 B2 * | 6/2015 | Gavlak | A61M 1/0001 |
| 9,089,801 B1 * | 7/2015 | Gavlak | A61M 1/0001 |
| 2012/0111778 A1 | 5/2012 | Gavlak et al. | |

(Continued)

OTHER PUBLICATIONS

International Search Report for International Appln. No. PCT/US2015/35262; International Filing Date: Jun. 11, 2015; dated Sep. 15, 2015; 9 pages.

(Continued)

*Primary Examiner* — Patrick F Brinson
(74) *Attorney, Agent, or Firm* — Cantor Colburn LLP

(57) ABSTRACT

A protective cap assembly for hydraulic ports of a component includes a plurality of caps, each cap of the plurality of caps installable over a hydraulic port of the component, and a web interconnecting the plurality of caps. A hydraulic system component includes a plurality of hydraulic ports configured for a fluid flow therethrough and a protective cap assembly for the plurality of hydraulic ports. The protective cap assembly includes a plurality of caps, each cap of the plurality of caps installable over a hydraulic port of the component and a web interconnecting the plurality of caps.

15 Claims, 3 Drawing Sheets

(56) References Cited

U.S. PATENT DOCUMENTS

2013/0183557 A1    7/2013  Schwarz

OTHER PUBLICATIONS

Written Opinion for International Appln. No. PCT/US2015/35262; International Filing Date: Jun. 11, 2015; dated Sep. 15, 2015; 4 pages.
International Preliminary Report on Patentability for International Appln. No. PCT/US2015/035262; Interntional Filing Date: Jun. 11, 2015; dated Dec. 15, 2016; pp. 1-5.
Notrh Atlantic Treaty Organization, "Best Practices for the Mitigation and Control of Foreign Object Damage-Induced High Cycle Fatigue in Gas Turbine Engine Compression System Airfoils", RTO Applied Vehicle Technology Panel (AVT) Task Group-094, Published Jun. 2005, pp. 1-212.
Rotor.org, "Foreign Object Debris and Foreign Object Damage (FOD) Prevention for Aviation Maintenance & Manufacturing", Revision No. 0, Nov. 13, 2007, downloaded from www.rotor.org/portals/1/committee/fod.docon Oct. 28, 2013, pp. 1-52.
Tyco Electronics, "AMP Circular Connector for Commercial Signal & Power Applications", Catalog 82021, Revised Jul. 2007, downloaded from www.te.com/commerce/.../DDEController?Action=srchrtrv...5 . . . on Oct. 28, 2013., pp. 1-51.

\* cited by examiner

HYDRAULIC MANIFOLD CAP WEB

CROSS REFERENCE TO RELATED APPLICATIONS

This application is a National Stage application of PCT/US2015/035262, filed Jun. 11, 2015, which claims the benefit of U.S. Provisional Application No. 62/010,740, filed Jun. 11, 2014, both of which are incorporated by reference in their entirety herein.

BACKGROUND

The present disclosure generally relates to hydraulic systems. More specifically, the present disclosure relates to protection of hydraulic systems during manufacturing and/or shipping of components having hydraulic ports.

Articles such as aircraft and aircraft components typically include hydraulic manifolds and ports to allow for flow of hydraulic fluid between components during operation. During manufacturing and shipping of the components, it is often desired to cover or cap the hydraulic ports to prevent foreign material from entering into or damaging the ports. Foreign material such as dirt, dust, oils, etc. in the hydraulic system can seriously degrade the performance of the hydraulic system and often result in failure of the hydraulic system. Presently, plastic caps are utilized to cover individual ports. The caps are designed for single use, and consequently become potential foreign material when removed from the port. Further, the individual caps are generally small, and it is often not visually apparent that a cap is in place on the port, and consequently, a mating part can be installed to the port with the cap still in place, resulting in assembly error and non-functionality of the hydraulic system.

BRIEF SUMMARY

In one embodiment, a protective cap assembly for hydraulic ports of a component includes a plurality of caps, each cap of the plurality of caps installable over a hydraulic port of the component, and a web interconnecting the plurality of caps.

Additionally or alternatively, in this or other embodiments the web includes a plurality of interconnected web arms extending between the caps of the plurality of caps.

Additionally or alternatively, in this or other embodiments the plurality of web arms comprises a plurality of tubular members.

Additionally or alternatively, in this or other embodiments the cap assembly is formed from a rubber material.

Additionally or alternatively, in this or other embodiments the web is pretensioned prior to installation of the cap assembly on the plurality of hydraulic ports.

Additionally or alternatively, in this or other embodiments a distance between caps of the cap assembly is less than a distance between corresponding hydraulic ports of the component.

Additionally or alternatively, in this or other embodiments the plurality of caps each have an outer surface configured to prevent installation of a mating component to the hydraulic ports prior to removal of the cap assembly.

Additionally or alternatively, in this or other embodiments a cap inner diameter is substantially equal to a corresponding hydraulic port outer diameter.

Additionally or alternatively, in this or other embodiments the plurality of caps are each configured to prevent ingress of contaminants into the corresponding hydraulic port.

In another embodiment, a hydraulic system component includes a plurality of hydraulic ports configured for a fluid flow therethrough and a protective cap assembly for the plurality of hydraulic ports. The protective cap assembly includes a plurality of caps, each cap of the plurality of caps configured to be installed over a hydraulic port of the component, and a web interconnecting the plurality of caps.

Additionally or alternatively, in this or other embodiments the web includes a plurality of interconnected web arms extending between the caps of the plurality of caps.

Additionally or alternatively, in this or other embodiments the plurality of web arms comprises a plurality of tubular members.

Additionally or alternatively, in this or other embodiments the cap assembly is formed from an elastomeric material.

Additionally or alternatively, in this or other embodiments the web is pretensioned prior to installation of the cap assembly onto the plurality of hydraulic ports.

Additionally or alternatively, in this or other embodiments prior to the installation of the cap assembly a distance between caps of the cap assembly is less than a distance between corresponding hydraulic ports of the component.

Additionally or alternatively, in this or other embodiments the plurality of caps each have an outer surface configured to prevent installation of a mating component to the hydraulic ports prior to removal of the cap assembly.

Additionally or alternatively, in this or other embodiments a cap inner diameter is substantially equal to a corresponding hydraulic port outer diameter.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 1:
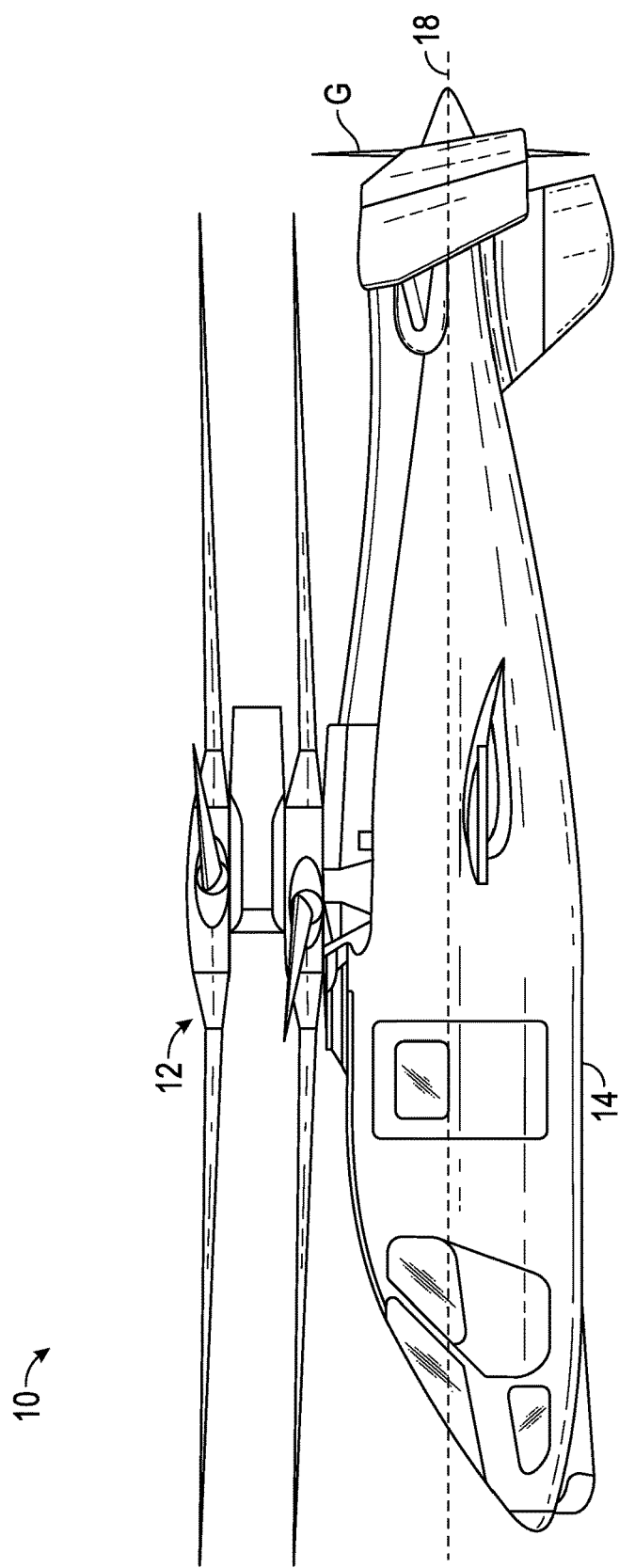
FIG. 1 is a general side view of an exemplary rotary wing aircraft for use in accordance with embodiments.

FIG. 1 illustrates an exemplary vertical takeoff and landing (VTOL) high speed compound or coaxial contra-rotating rigid rotor aircraft 10 having a dual, contra-rotating main rotor system 12, which rotates about a rotor axis. The aircraft 10 includes an airframe 14 which supports the dual, contra-rotating, coaxial main rotor system 12 as well as a translational thrust system 16 which provides translational thrust generally parallel to an aircraft longitudinal axis 18. Although a particular rotary wing aircraft configuration is illustrated and described in the disclosed non-limiting embodiment, other configurations and/or machines with rotor systems are within the scope of the present invention. It is to be appreciated that while the description herein relates to a rotary wing aircraft, the disclosure herein may be as readily applied to other systems and aircraft structures.

Figure 2:
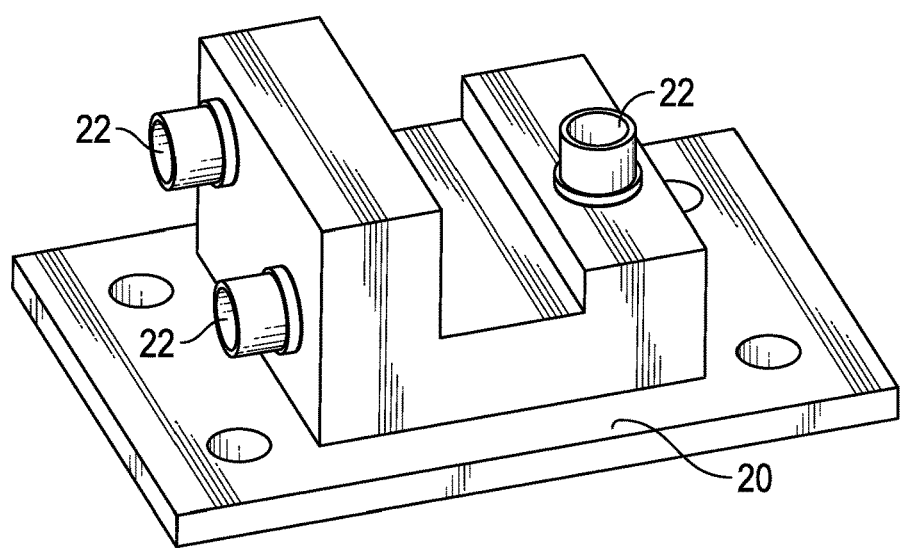
FIG. 2 is a schematic view of a hydraulic system component including a plurality of hydraulic ports.

Aircraft 10 typically includes hydraulically-operated components 20, such as manifolds or actuators for control and actuation of, for example, the main rotor system 12 and/or control surfaces (not shown) on the airframe 14. The hydraulic components 20 include a plurality of hydraulic ports 22, as shown schematically in FIG. 2. During manufacture of the hydraulic components 20, and also during shipping and installation of the components onto the aircraft 10, prior to installation of mating connectors (not shown), the hydraulic ports 22 are open and exposed, and necessitate protection from dust, dirt and other debris that would otherwise enter the hydraulic ports 22 and contaminate the component 20, and thus the hydraulic system of the aircraft 10.

Figure 3:
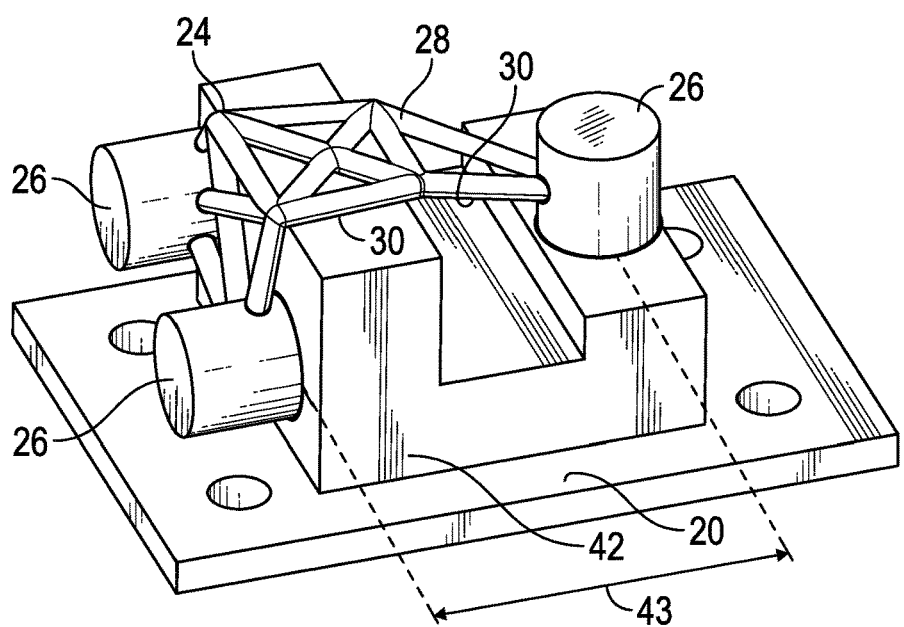
FIG. 3 is a schematic view of a cap assembly for a hydraulic system component.

To prevent contamination of the hydraulic ports 22, a cap assembly 24 is installed over the hydraulic ports 22 as shown in FIG. 3. The cap assembly 24 includes a plurality of caps 26, one cap 26 to cover each hydraulic port 22 of the plurality of hydraulic ports 22. The caps 26 are interconnected by a web 28, including a plurality of web arms 30 forming a flexible support for the caps 26. The cap assembly 24 is configured for installation to a particular configuration of hydraulic ports 22, or to a particular component 20.

Figure 4:
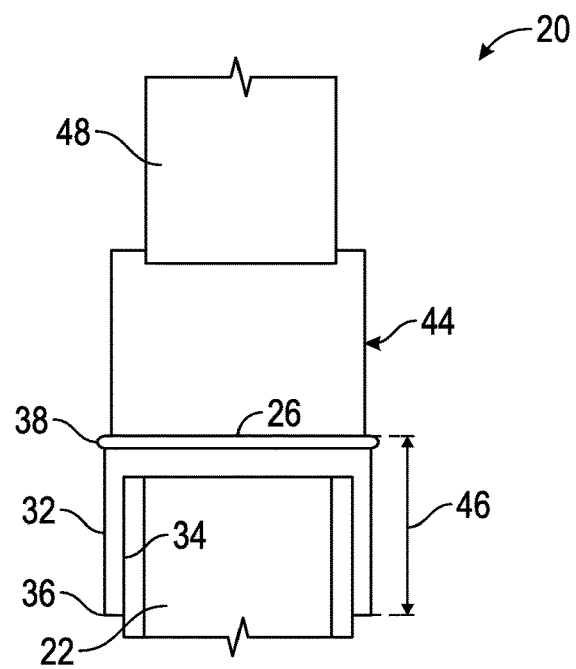
FIG. 4 is a cross-sectional view of a cap for a hydraulic port.

Referring to the cross-sectional view of FIG. 4, the cap 26 fits over the hydraulic port 22 and is open at a first cap end 36 and closed at a second cap end 38. The first cap end 36 has a cap inner diameter 32 equal to, or slightly greater than a port outer diameter 34. This allows for installation of the cap assembly 24 without the use of a high level of force, which may damage the hydraulic port 22. The relatively tight fit between the cap 26 and the hydraulic port 22 secures the cap 26 in place at the hydraulic port 22, retaining the cap 26 and preventing the cap 26 from inadvertently being removed from the hydraulic port 22. Further, in some embodiments, a cap outer diameter 44 and/or cap height 46 is large enough such that a mating connector 48, or mating component, cannot be installed without removal of the cap assembly 24 from the hydraulic port 22.

Figure 5:
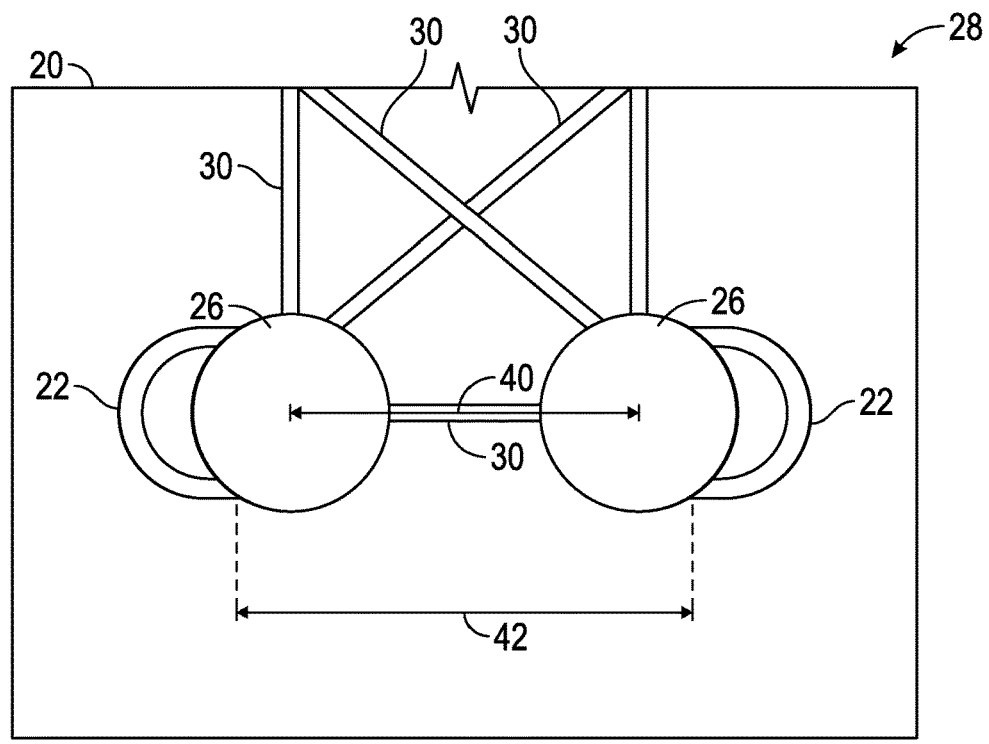
FIG. 5 is a side view of a hydraulic system component with a cap assembly for the plurality of hydraulic ports.

Referring again to FIG. 3, the web 28 includes an array of interconnected web arms 30, which in some embodiments are solid cylindrical or tubular members. The web arms 30 and the caps 26 are in some embodiments formed from a flexible rubber or other elastomeric material. Further, as shown in FIG. 5, in some embodiments, a web length 40 between caps 26 is less than a port distance 42 between corresponding hydraulic ports 22. Thus, when the cap assembly 24 is installed to the hydraulic ports 22, tension is introduced to the cap assembly 24 ensuring a tight fit to the hydraulic ports 22.

The cap assembly 24 provides many advantages over the typical plastic cap. The larger cap assembly 24 size results in higher visibility of the cap assembly 24. Thus, removed cap assemblies 24 are less likely to be misplaced once removed. Color—e.g. bright, fluorescent, variegated—may also be incorporated into the cap assembly 24 material to further increase visibility of the cap assembly 24. Further, the higher visibility and increased size help to prevent installation of mating connectors without first removing the cap assembly 24. The rubber construction of the cap assembly 24 and the pretension of the web 28 at installation provide a tight fit of the cap assembly 24 to the hydraulic ports 22, preventing the cap assembly 24 from being inadvertently removed. The cap assembly 24 also has sufficient durability that it may be reused multiple times.

While the invention has been described in detail in connection with only a limited number of embodiments, it should be readily understood that the invention is not limited to such disclosed embodiments. For instance, while described in terms of aircraft, it is understood that aspects could be used in other contexts such as for wind turbines, maritime propulsion, or other technologies in which a rotating element's plan of rotation will vary from perpendicular with the axis of rotation of a shaft driving the rotating element. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A protective cap assembly for hydraulic ports of a component comprising:
   a plurality of caps, each cap of the plurality of caps installable over a hydraulic port of the component; and
   a web interconnecting the plurality of caps, wherein the web is pretensioned prior to installation of the cap assembly on the plurality of hydraulic ports.

2. The cap assembly of claim 1, wherein the web comprises a plurality of interconnected web arms extending between the caps of the plurality of caps.

3. The cap assembly of claim 2, wherein the plurality of web arms comprises a plurality of tubular members.

4. The cap assembly of claim 1, wherein the cap assembly is formed from a rubber material.

5. The cap assembly of claim 1, wherein a distance between caps of the cap assembly is less than a distance between corresponding hydraulic ports of the component.

6. The cap assembly of claim 1, wherein the plurality of caps each have an outer surface configured to prevent installation of a mating component to the hydraulic ports prior to removal of the cap assembly.

7. The cap assembly of claim 1, wherein a cap inner diameter is substantially equal to a corresponding hydraulic port outer diameter.

8. The cap assembly of claim 1, wherein the plurality of caps are each configured to prevent ingress of contaminants into the corresponding hydraulic port.

9. A hydraulic system component comprising:
   a plurality of hydraulic ports configured for a fluid flow therethrough; and
   a protective cap assembly for the plurality of hydraulic ports including:
   a plurality of caps, each cap of the plurality of caps configured to be installed over a hydraulic port of the component; and
   a web interconnecting the plurality of caps, wherein the web is pretensioned prior to installation of the cap assembly onto the plurality of hydraulic ports.

10. The hydraulic system component of claim 9, wherein the web comprises a plurality of interconnected web arms extending between the caps of the plurality of caps.

11. The hydraulic system component of claim 10, wherein the plurality of web arms comprises a plurality of tubular members.

12. The hydraulic system component of claim 9, wherein the cap assembly is formed from an elastomeric material.

13. The hydraulic system component of claim 9, wherein prior to the installation of the cap assembly a distance between caps of the cap assembly is less than a distance between corresponding hydraulic ports of the component.

14. The hydraulic system component of claim 9, wherein the plurality of caps each have an outer surface configured to prevent installation of a mating component to the hydraulic ports prior to removal of the cap assembly.

15. The hydraulic system component of claim 9, wherein a cap inner diameter is substantially equal to a corresponding hydraulic port outer diameter.

\* \* \* \* \*